Oct. 28, 1941.  W. R. BEATTIE  2,260,597
LIGHT DIRECTING DEVICE
Filed Jan. 13, 1940
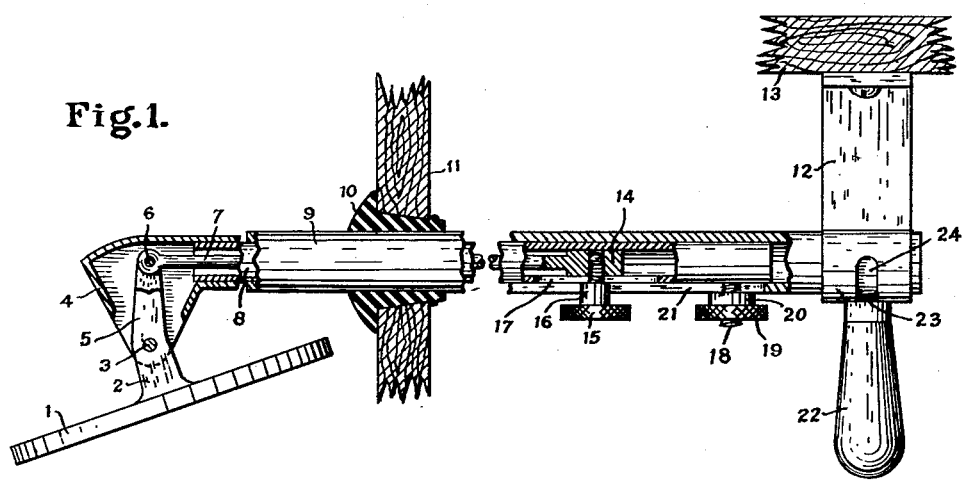
Fig. 1.
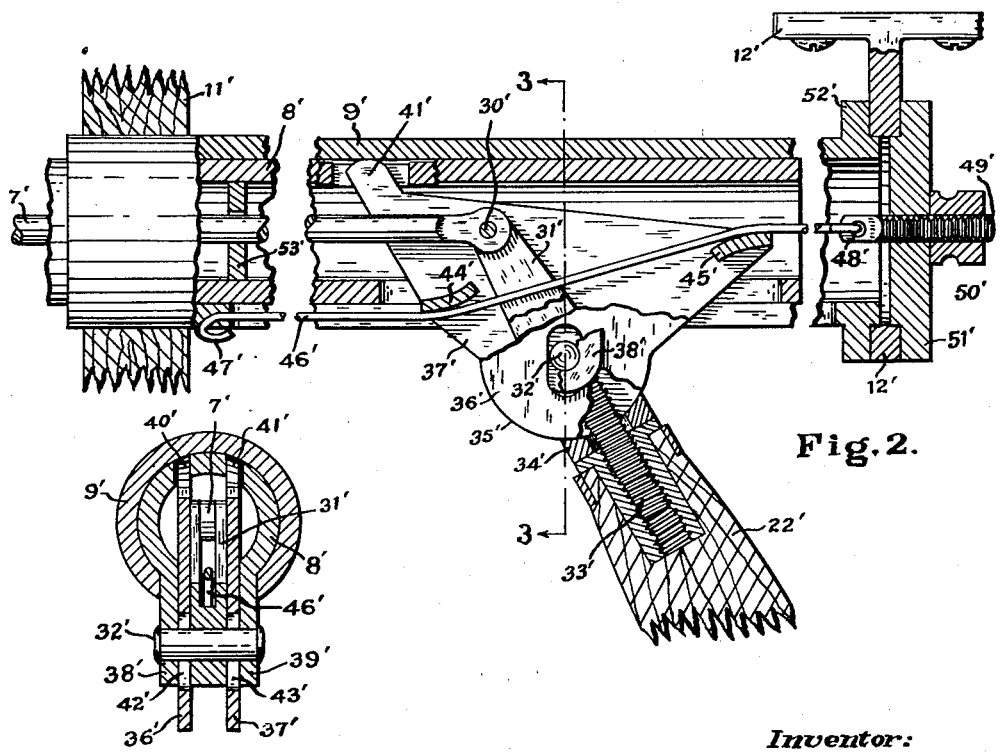
Fig. 2.
Fig. 3.
*Inventor:*
Walter R. Beattie,
By Rudolph B. Prentice
*Attorney.*

Patented Oct. 28, 1941

2,260,597

UNITED STATES PATENT OFFICE 2,260,597

LIGHT DIRECTING DEVICE

Walter R. Beattie, Milwaukie, Oreg.

Application January 13, 1940, Serial No. 313,747

2 Claims. (Cl. 248—276)

This invention relates to light directing devices of the general type adapted for use as an externally extending mounting for mirrors or spotlights and as a control means operable from the interior of a motor vehicle to regulate the attitude of the said mirror or spotlight in universal and extensible adjustment to facilitate the viewing of such prospects as are requisite to the safe operation of the vehicle.

More specifically, this invention contemplates such practical means as may supplement the usual vehicle controls which are capable of manipulation by the driver when the vehicle is in full operation.

The principal object of my invention is to expand the utility of the said mirror and spotlight accessories to embrace all of the desirable adjustments when used upon trucks having obstructive structures or loads which ordinarily preclude the efficient use of these facilities as conventionally constructed.

A second object is to provide such a device as will not interfere with other traffic.

Other objects and advantages of my invention will be apparent in the following discourse wherein the significance of the reference characters in the accompanying drawing, details of construction of a typical device embodying my invention and the particular advantages thereof, are explained.

In the drawing:

Figure 1 represents a view of the entire device shown in fragmentary section and elevation to reveal the relationships and connections of the several elements.

Figure 2 represents a view of a modified form of control mechanism in fragmentary section and elevation.

Figure 3 represents a sectional view taken along the line 3—3 of Figure 2.

Referring to the drawing:

A mirror 1, formed with a supporting arm 2, is pivotally mounted at 3 in a chambered head 4 into which an extension 5 of the arm 2 projects to a pivotal connection 6 with the rod 7 contained within the inner tube 8 in turn rotatably and slidably fitted in the outer tube 9 journaled in the rubber bushing 10 in the left-hand side-wall of the cab-inclosure 11 and the bracket 12 secured to the front-wall 13 of the cab-inclosure above the windshield not shown.

The rod 7 terminates interiorly in a nut 14 of circular cross-section slidably fitted within the inner tube 8 to receive a thumb-screw 15 threaded diametrally thereinto, the latter being formed with a shoulder 16 to engage the inner tube 8 in clamping action adjacent the sides of a slot 17 wide enough to accommodate only the screw portion of the thumb-screw 15.

The inner tube 8 terminates interiorly in a mounting for the screw 18 rigidly secured thereto and fitted with a thumb-nut 19 formed with a shoulder 20 to engage the outer tube 9 in clamping action adjacent the sides of a relatively long slot 21 formed in the outer tube 9.

The outer tube 9 terminates interiorly in a threaded mounting for the screw-handle 22 the screw 23 of which passes through the slot 24 in the bracket 12 to form a clamp to secure the outer tube 9 against rotation in its journals.

This mechanism is capable of the following adjustments:

The mirror 1 may be swung about the pivot 3 by longitudinal movement of the rod 7 actuated manually at the thumb-screw 15 which has longitudinal movement through the slot 17 in the inner tube 8 through a relatively short distance to effect the desired amplitude of angular adjustment of the mirror 1.

The inner tube 8, carrying the mirror and its angular adjusting mechanism, is longitudinally adjustable within the outer tube 9 by means of the thumb-nut 19 which serves as a clamp to secure the outer and inner tubes 9 and 8, respectively, together; the screw 18 having movement for a relatively great distance through the slot 21 in the outer tube 9 to effect the lateral extension of the mirror 1 beyond rearward obstructions.

The rotatably mounted outer tube 9 serves as a horizontal axis complementary to the pivot 3 to allow of universal adjustment of the mirror 1 upon perpendicularly related axes.

Thus the mirror 1 may be adjusted as to angular attitude about a universal mounting and as to position in lateral movement from within the cab of the vehicle.

It will be readily apparent that a spot-light may as conveniently be mounted in the place of the mirror and the same directional control availed of. And likewise it is obvious that both a mirror and a spot-light may be mounted together upon the same supporting arm to provide a coactive use of both mirror and light of great value in backing a loaded truck to a place of delivery and furnishing light for the work of loading or unloading, or other obvious uses.

In Figures 2 and 3 are shown a convenient method of combining the controls represented in the device illustrated in Figure 1 by the thumb-screw 15, the thumb-nut 19, and the handle 22, into a single control handle 22' controlling all of these adjustments in movement and clamping action by a single operation.

For convenient comparison reference numerals with prime exponents are applied to parts of the modified control device which have similar functions to those represented by the same numerals in the previously described mechanism.

In this form the rod 7' terminates interiorly in a pivotal connection 30' with a lever 31" in turn pivotally mounted at 32' and terminating at the opposite end in a screw 33' over which a washer 34' is slidable to make frictional contact with the arcuate surfaces indicated at 35' when pressure is applied by means of the handle 22' mounted upon the screw 33'.

The pivot 32' is secured through the symmetrical lugs 38' and 39', shown in section in Figure 3, integral with the inner tube 8'. Disposed between the lever 31' and the said lugs 38' and 39' are respectively disposed the two symmetrically formed plates 36' and 37' formed with opposed fingers 40' and 41' in frictional contact with the interior of the outer tube 9', the arcuate surfaces indicated at 35', and the apposed slots 42' and 43' embracing the pivot 32'. Securing these two plates 35' and 36' together are two shoes 44' and 45' integral therewith which serve to deflect the spring-wire tension member 46' into proper alignment with the terminal anchor at 47' and the opposite end-connection at 48' with the adjusting-screw 49' controlled by the thumb-nut 50'.

The thumb-nut 50' bears against a cap 51' between which and the flange 52' formed on the end of the outer tube 9', the bracket 12' is clamped in response to tensioning of the member 46' to secure the outer tube 9 against rotation.

The rod 7' is conveniently supported against vibration by elastic bushings as 53' pressed into the inner tube 8'.

Loosening of the handle 22' frees all of the relatively adjustable parts. The pressure transmitted by the handle 22' through the washer 34' at any practical angular attitude of the screw 33' less than right angles with the axes of the slots 42' and 43' is resolved by these said slots into movement of the plates 36' and 37' toward the center of the tubes 8' and 9' and more or less perpendicularly to the axis thereof.

Because of the resistance to movement of the fingers 40' and 41' in frictional contact with the interior of the tube 9' the plates 36' and 37' are further driven in a rotary motion about the axis of the pivot 32' resulting in stresses between the shoes 44' and 45' and the tension-member 46', stressing the latter in tension to clamp the outer tube 9' against rotation in its journals as just described.

The rod 7' and hence the mirror as shown at 1 in Figure 1 is held in secure adjustment by virtue of the friction between the washer 34' and the arcuate surfaces at 35'; the outer tube 9' is held against rotation by virtue of the friction between the cap 51' the flange 52' and the bracket 12'; and the inner tube 8' with its burden of mirror or spot-light is held in longitudinal security by virtue of the friction between the fingers 40' and 41' and the outer tube 9' on the one hand and between the shoes 44' and 45' and the tension member 46' on the other hand.

Thus, with one hand, a driver may make all of the required adjustments and secure the device at the selected adjustment by screwing up the handle 22' with which the adjustments were made.

The advantages of this invention are obvious and its importance to safe operation of vehicles must be apparent.

I claim:

1. A light directing device for automobiles comprising, a slotted tube journaled in the body of the car, clamp means to secure said tube against rotation, a second slotted tube slidable in said first tube, clamp means securing said second tube against movement relative to said first tube, a rod slidable in said second tube, clamp means securing said rod against movement relative to said second tube, and a light directing element pivotally supported upon and connected respectively to the outer extremities of said second tube and said rod.

2. A light directing device for automobiles comprising, a tube formed with a longitudinal slot journaled in the body of the car, clamp means to secure said tube against rotation, a second tube formed with a longitudinal slot slidable in said first tube, clamp means securing said second tube against movement relative to said first tube, a rod slidable in said second tube, a light directing element pivotally supported upon and connected respectively to the outer extremities of said second tube and said rod, and integral control means governing the rotation of said first tube, the extension of said second tube, and the movement of said rod, adapted to actuate all of said clamping means by a single force resolved and applied to the several means.

WALTER R. BEATTIE.